US006021667A

United States Patent [19]

Gellerson deceased, late of Vakime, by et al.

[11] Patent Number: 6,021,667

[45] Date of Patent: Feb. 8, 2000

[54] AUTOMATED WORK STATION APPARATUS AND METHOD

[75] Inventors: Walter G. Gellerson, deceased, late of Vakime, by, Mary Jane Gellerson, executrix; Robert B. Kingsley, both of Yakima; Randall G. Cline, Tieton, all of Wash.

[73] Assignee: Dowty Aerospace Yakima, Yakima, Wash.

[21] Appl. No.: 09/164,729

[22] Filed: Oct. 1, 1998

[51] Int. Cl.[7] .......... G01M 19/00

[52] U.S. Cl. .......... 73/168; 73/865.9

[58] Field of Search .......... 73/865.9, 168, 73/712, 195, 198, 201, 273, 152.61, 1.01–1.89; 324/73.1

[56] References Cited

U.S. PATENT DOCUMENTS

| | | | |
|---|---|---|---|
| 3,505,876 | 4/1970 | Niebergall | 73/865.9 |
| 4,211,110 | 7/1980 | Glomski | 73/865.9 |
| 4,916,641 | 4/1990 | Bybee | 73/1.34 |
| 4,926,118 | 5/1990 | O'Connor et al. | 73/865.6 |
| 5,337,262 | 8/1994 | Luthi et al. | 73/1.71 |
| 5,353,654 | 10/1994 | Lin | 73/865.9 |
| 5,477,544 | 12/1995 | Botelho | 324/73.1 |
| 5,526,680 | 6/1996 | McLaughlin | 73/866 |
| 5,526,705 | 6/1996 | Skotnikov et al. | 73/866 |
| 5,623,411 | 4/1997 | Morvan | 324/73.1 |
| 5,637,812 | 6/1997 | Baker et al. | 73/865.6 |
| 5,702,184 | 12/1997 | Chang | 73/865.9 |

*Primary Examiner*—Hezron Williams
*Assistant Examiner*—Chad Soliz
*Attorney, Agent, or Firm*—William W. Haefliger

[57] ABSTRACT

An automated work station for testing hydraulic equipment having first hydraulic input and output ports comprising in combination a test cabinet and associated input keyboard and test data display means; a cabinet having associated second hydraulic input and output ports to be coupled to the first ports; circuitry within the cabinet and connected with the keyboard to control display of hydraulic parameters to be tested, the circuitry having inputs to be electrically connected with selectable groups of terminals corresponding to selected hydraulic equipment to be tested, and there being a characteristic control circuit for each hydraulic equipment to be tested, each characteristic control circuit being connectable with circuitry in the cabinet.

16 Claims, 10 Drawing Sheets

AUTOMATED WORK STATION APPARATUS AND METHOD

BACKGROUND OF THE INVENTION

This invention relates generally to testing of hydraulic equipment, and more particularly to provision of an automatic work station operable to test such equipment.

There is need for automatic means to rapidly and efficiently test the integrities of hydraulic lines and fluids in such lines, on hydraulic equipment, as for example hydraulic pressure levels, and temperature of hydraulic fluid in various lines. When an item of equipment has multiple such lines, sequential testing of each line at the equipment becomes time consuming and laborious. It is desirable that a way be provided whereby automatic, rapid testing can be achieved. Also, it is desirable that a way be provided to enable a work station to test various items of hydraulic equipment, which differ in their designs. Also, there is need for reducing product testing time, test supervision, and paper work by the test operator, while increasing quality, as well as for a powerful and user friendly computer system coupled with reliable hydraulic controls.

SUMMARY OF THE INVENTION

It is a major object of the invention to provide method and means to enable the desired automatic testing of various items of hydraulic equipment. Basically, the invention provides an automatic work station for testing hydraulic equipment having first hydraulic input and output ports, a preferred apparatus comprising in combination:

a) a test cabinet and associated input keyboard and test data display means, b) the cabinet having associated second hydraulic input and output ports to be coupled to such first ports, c) circuitry within the cabinet and connected with the keyboard to control display of hydraulic parameters to be tested, d) such circuitry having inputs to be electrically connected with selectable groups of terminals corresponding to selected hydraulic equipments to be tested, and e) there being a characteristic control circuit for each hydraulic equipment to be tested, each said characteristic control circuit being connectible with the circuitry in said cabinet.

Another object of the invention is to provide a module carrying the characteristic control circuit, the characteristic control circuit and the circuitry at the cabinet having interconnectible pin and socket connections. Typically, the module includes a circuit box that is removable from connection to the cabinet, to enable its replacement by a different module.

The simplifying approach is to make the most of the hydraulic controls on the test fixture, rather than providing a test bench with very complicated hydraulics. This makes the automated work station highly reliable, easy to maintain, and universal. Hydraulic controls and sensors are typically mounted on a single manifold. This allows for easy removal of controls and minimizes tubing failures.

A further object is to provide a tray projecting sidewardly from the cabinet, the equipment to be tested being positionable over the tray, whereby hydraulic leakage from ports is collected in the tray. As will be seen, an equipment carrier may be provided to be movable into and out of equipment testing position relative to the tray.

The design of the cabinetry to facilitate operator use is also important, and it is a further object to provide a cabinet having an upper panel angled downwardly, the display comprising a CRT screen at said panel. As will be seen, the cabinet may advantageously have side wall means defining a first recessed zone, said keyboard located at the recessed zone, for protection.

Hydraulic valve controls may be provided at that or another recessed zone, for their protection.

Yet another object includes provision of multiple such work stations, arranged for operation by a single operator, for efficient parallel testing of multiple items of hydraulic apparatus.

The method of using the apparatus referred to includes i) receiving hydraulic apparatus to be tested over the tray at the work station, ii) connecting hydraulic lines at the apparatus to be tested to hydraulic lines at the station, iii) flowing hydraulic fluid from such apparatus to be tested to said station, and sensing characteristics of the fluid at the station.

A further step includes providing a plug-in circuit device having circuitry corresponding to the parameters of hydraulic equipment to be tested, and connecting the device to the cabinet and to circuitry therein to enable testing of such parameters and display of test results.

These and other objects and advantages of the invention, as well as the details of an illustrative embodiment, will be more fully understood from the following specification and drawings, in which:

DRAWING DESCRIPTION

FIG. 1 is a perspective view showing the work station design;

FIG. 1*a* is a view like FIG. 1, and also showing an equipment transporter assembled to the work station;

Figure 8:
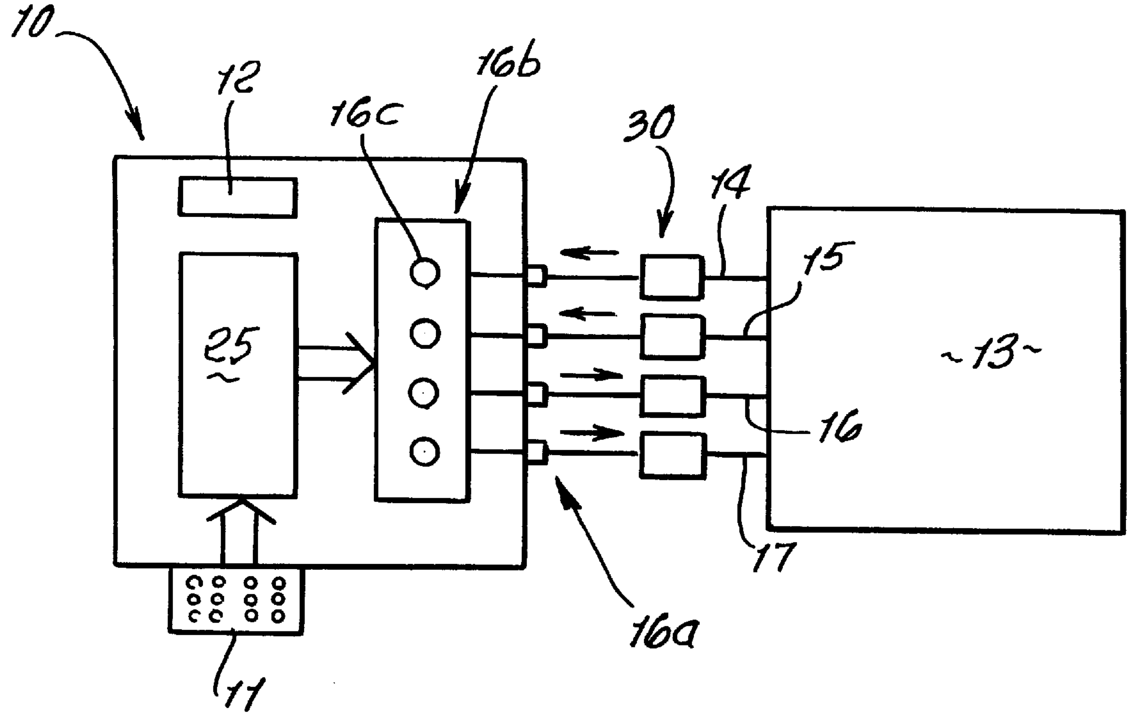
FIG. 8 is a functional schematic view of the automated work station.
Figure 8A:
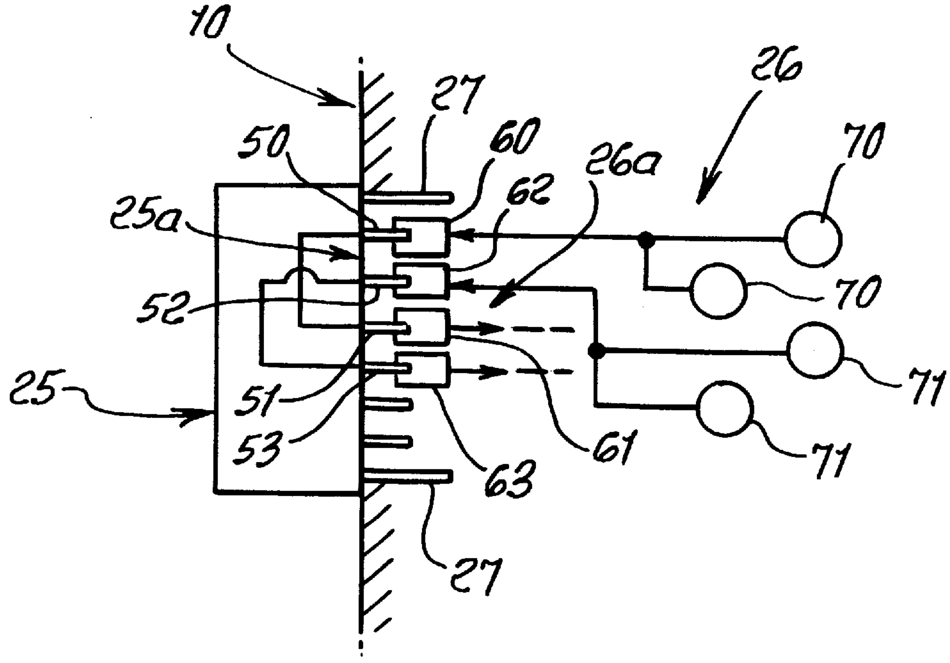
Figure 9:
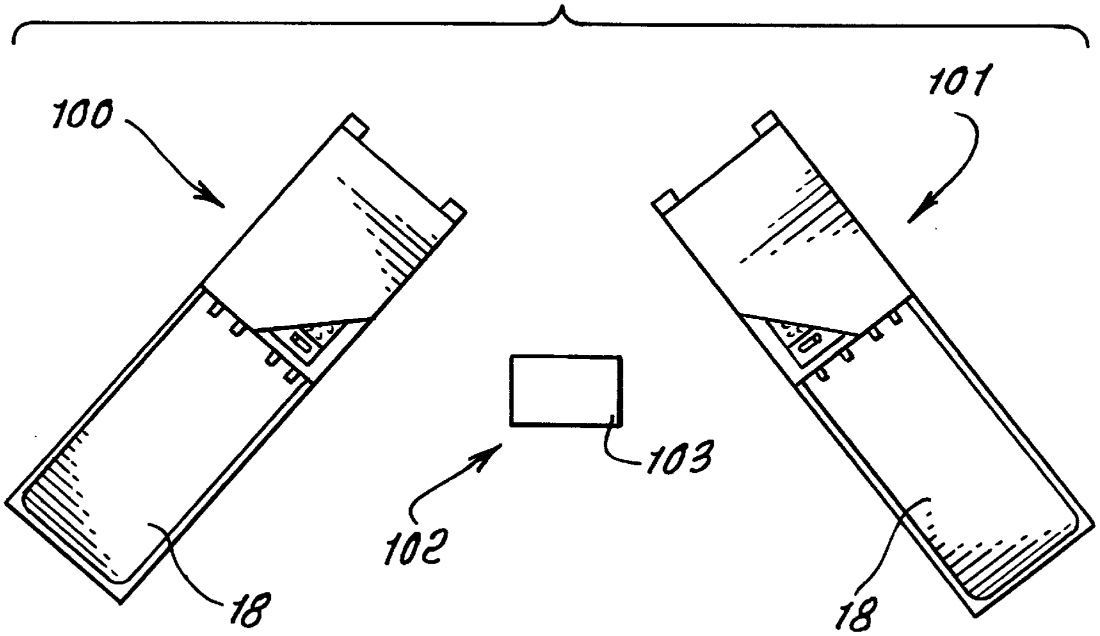
Figure 10:
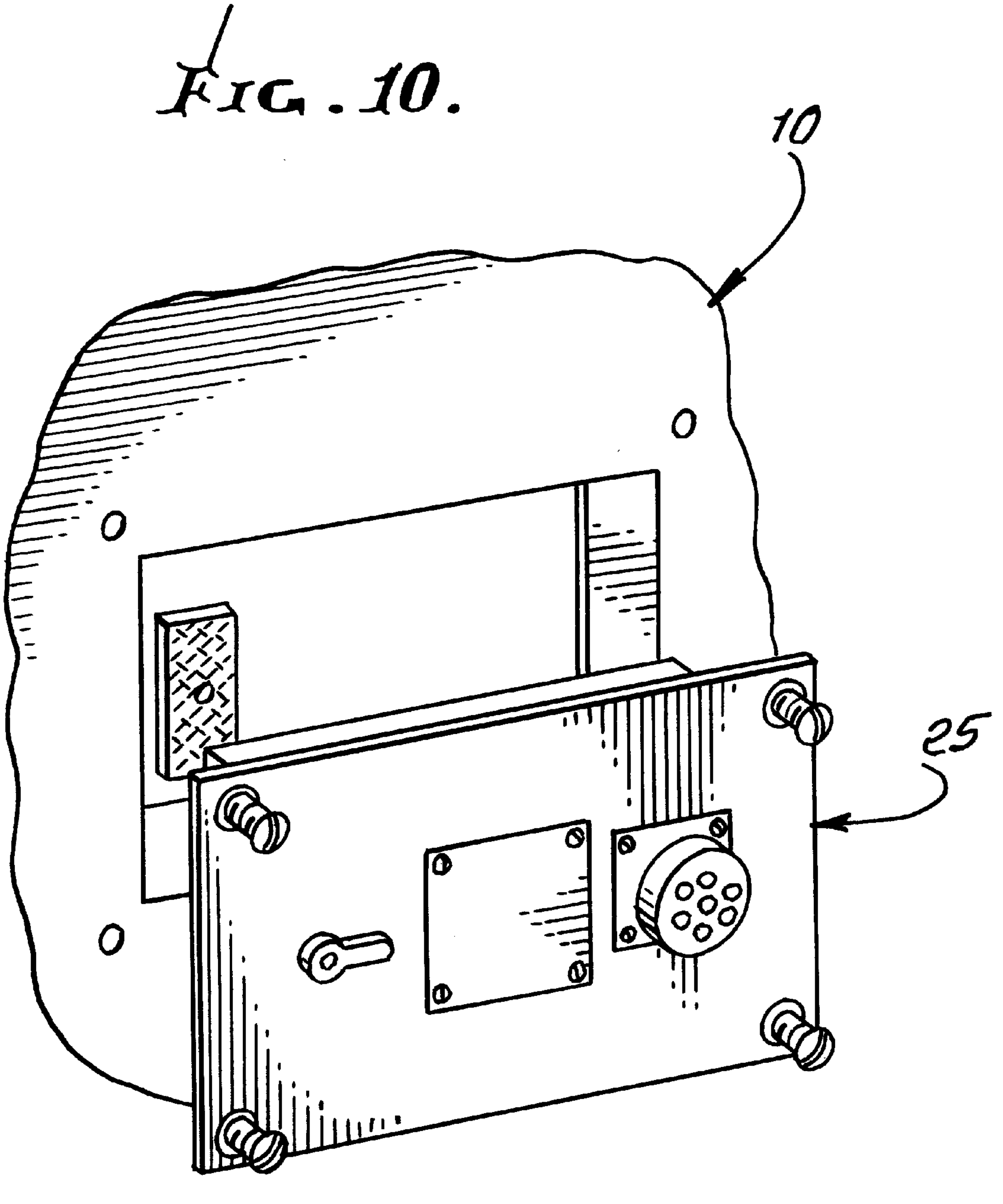
Figure 11A:
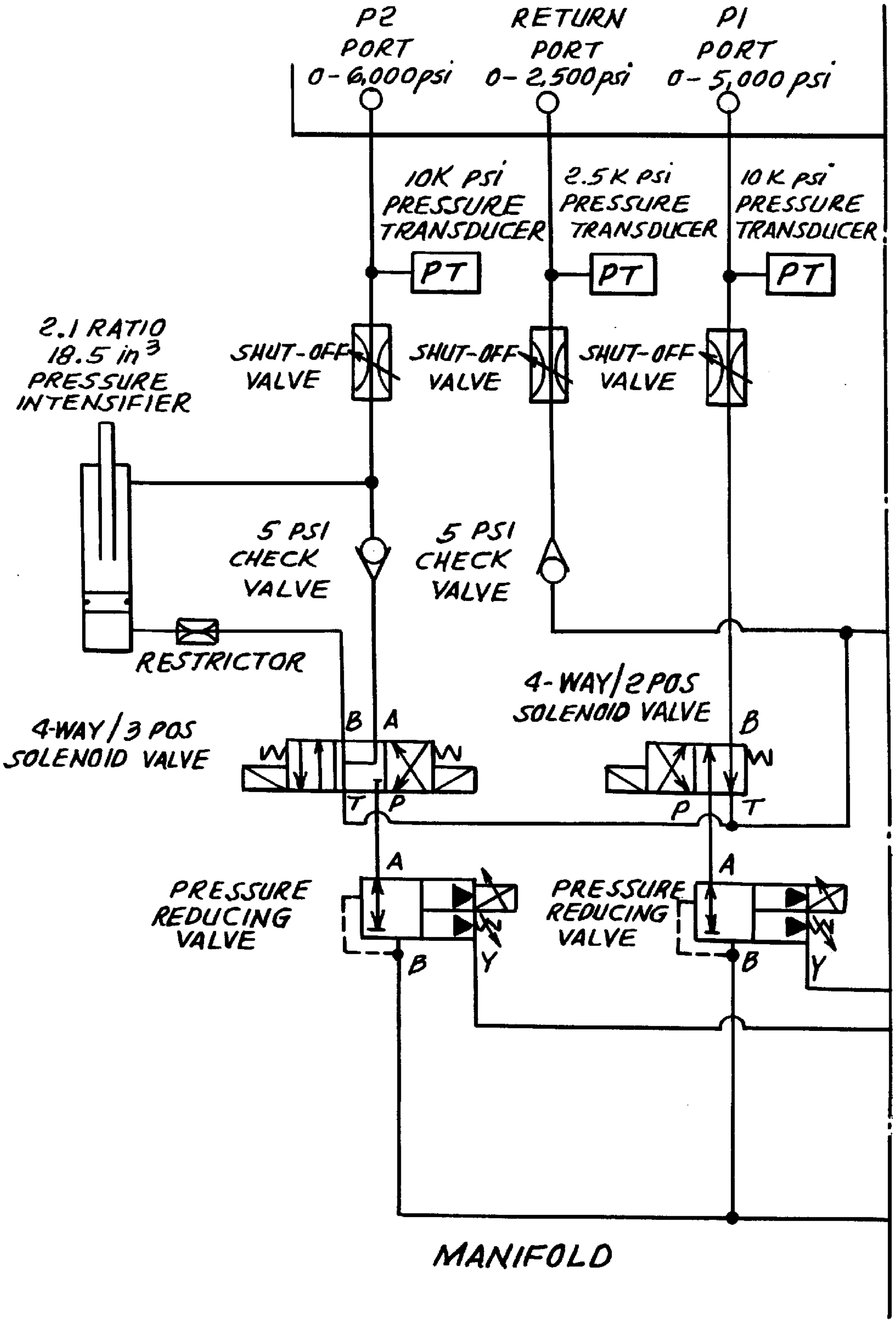
Figure 11B:
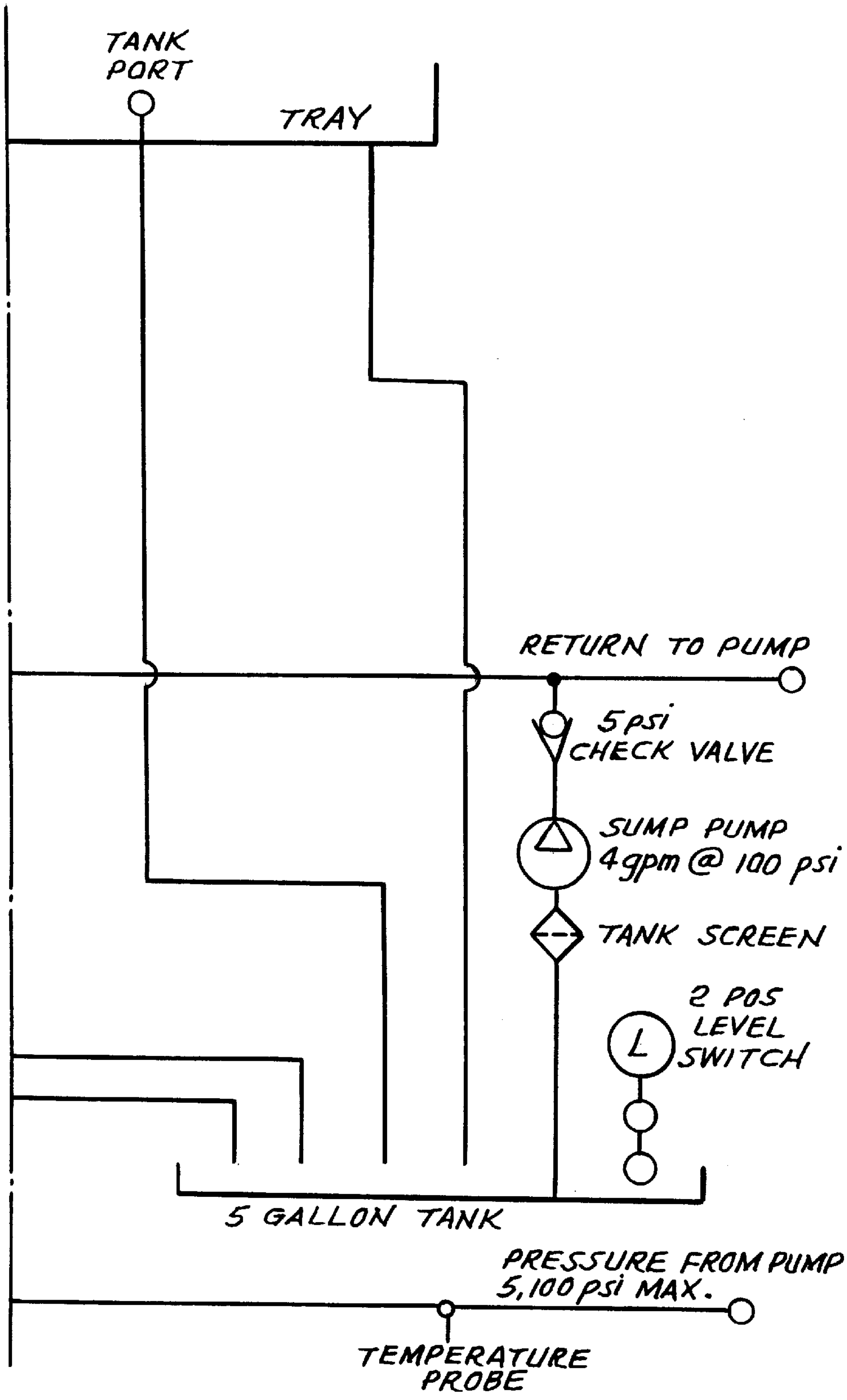

FIG. 8*a* shows plug-in connection of a modular circuit box to the station cabinet;

FIG. 9 is a top plan view of offset or mirror-imaged positioning of two control cabinets;

FIG. 10 shows an actual and representative interface module and bay;

FIG. 11 is a representative hydraulic schematic; and

Figure 12A:
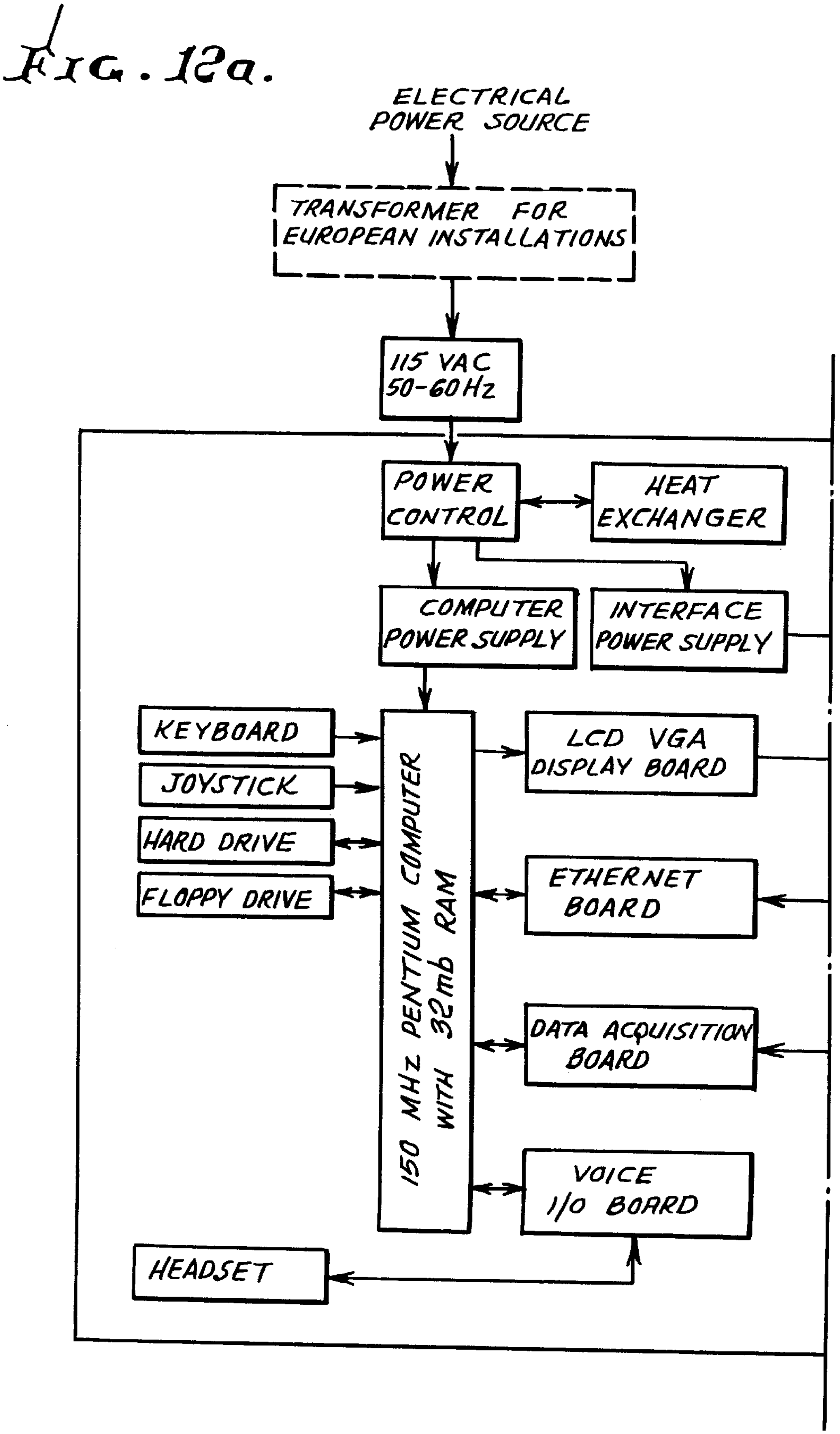
Figure 12B:
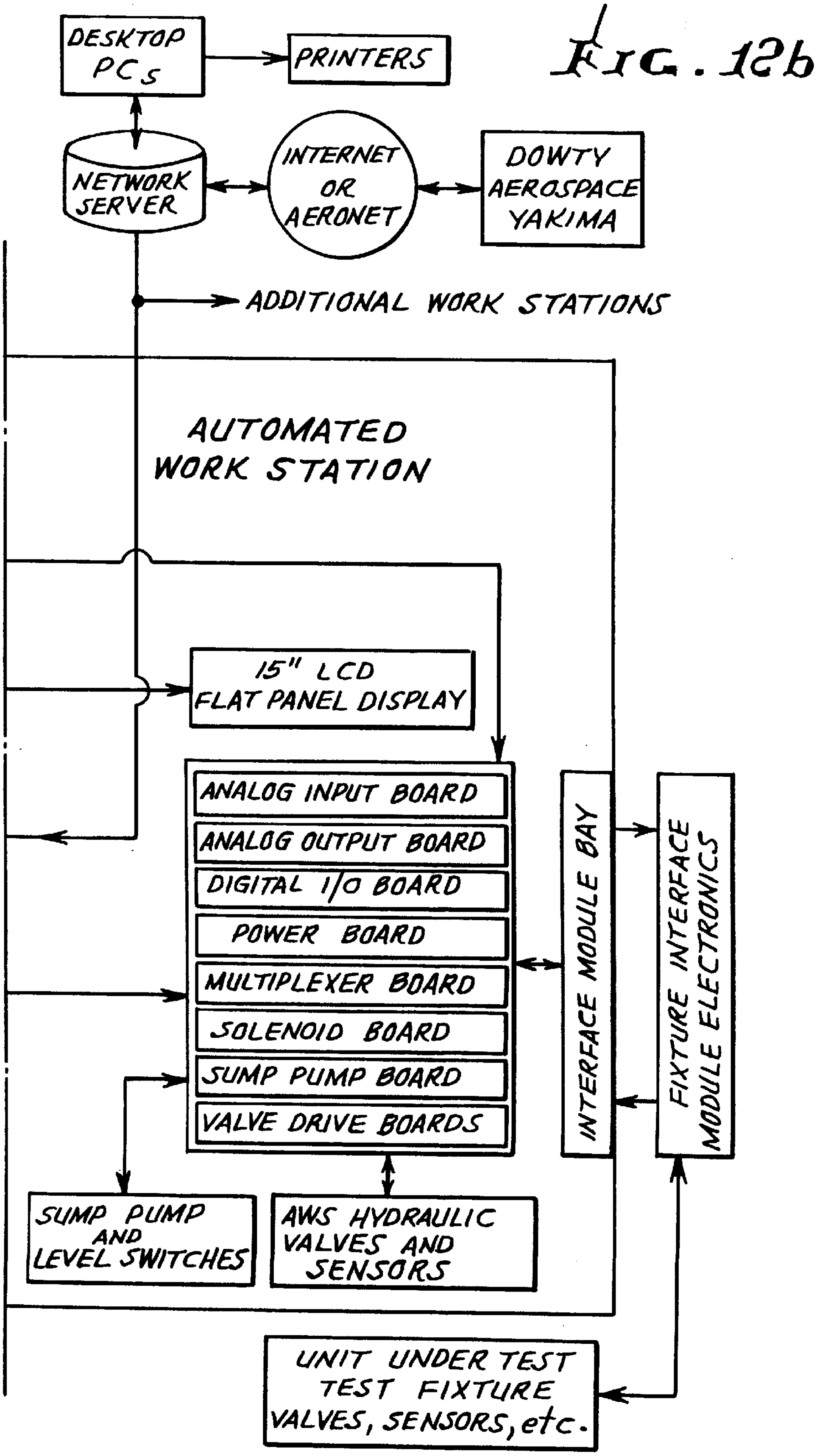

FIG. 12 is a representative electrical block diagram.

DETAILED DESCRIPTION

In FIG. 8, a test cabinet 10 is used and controlled (see input keyboard 11 and test data read-out screen 12), to test equipment 13. That equipment (large or small components) may be hydraulic and have hydraulic inputs at 14 and 15 from the equipment 13, and hydraulic returns 16 and 17 to the equipment 13 using couplings 30 and the ports 16*a*. See FIG. 1. Hydraulic controls 37 (valves, etc.) and a pressure generator 16*b*, may be employed, for use in pressurizing components to be tested.

Of importance is a "tongue", such as tray 18, projecting horizontally from the cabinet 10. The equipment to be tested slides over the tray, or is received in the tray, for testing. FIG. 1*a* shows a rolling carrier 40 having a frame 41 supported by legs 42 and wheels 43. A screen 44 on the frame passes leaking hydraulic fluid downwardly and retains equipment parts on the screen. Screen 44 slides over the tray, and the screen and carrier are nested relative to the tray. Independent support of equipment 13 avoids down-loading of the tray. A handle is seen at 41*a*. Carrier 40 supports equipment 13. The tray receives hydraulic fluid that leaks, as from couplings 30.

Each piece of equipment 13 has its own particular characteristics, to be tested, such as type, pressure and temperature of different hydraulic fluids. A plug-in module circuit box 25 is provided for each particular equipment 13, and a storage cabinet for the boxes 25 may be provided (not shown). The circuit box 25 is plugged into the cabinet wall, as at 27 and the apparatus is then ready for testing the corresponding equipment 13. See FIG. 8*a*. The pins 25*a* of the box interconnect with terminals 26*a* of the elements of the circuitry 26 in the cabinet, to correspond to the test parameters of 13, to be tested. For example pins 50 and 52 of the box connect to terminals 60 and 62 of the equipment circuitry; and pins 51 and 53 of the box connect to terminals 61 and 63 of the equipment circuitry. Other such connections are possible depending on the circuit to be tested. Terminals 50 and 62 may for example correspond to control of ON or OFF states of sensors or valves 70, and terminals 52 and 62 may correspond to control of ON or OFF states of sensors or valves 71.

Also of importance are:

a) location of CRT screen 12 on an overhead angled panel 37 of the cabinet;

b) location of the protected keyboard 38 in a recessed control zone 36 of the cabinet, with angled cabinet overhang at 39;

c) sideward projection of the raised tongue or tray 18 sidewardly from the zone 36;

d) hydraulic valve controls 37 protected in a second recessed zone 39 of the cabinet;

e) mirror-imaged positioning of two like cabinets (see FIG. 9);

f) two independent pressure outlets may typically be provided; one rated at 5000 psi and the other rated at 6000 psi, with a flow rate of 20 gpm each; the work station is designed to be connected to a user supplied remote hydraulic supply, enabling multiple stations to be served by a common source; each pressure outlet has its own pressure reducing valve with both manual and computer controls; in addition, both systems have a solenoid arming valve to connect to the hydraulic supply, a hand operated flow control valve, and a pressure transducer at the outlet port to monitor test pressure; FIG. 11 is a representative hydraulic schematic;

g) a drain tray is typically connected to an internal reservoir, which is automatically pumped to a remote hydraulic supply return by an internal sump pump; the drain tray has a tank port, which is connected to the reservoir for zero back pressure tests;

h) the operating system is a complete windowing graphic interface with detailed three dimensional controls such as movable windows, push buttons, check boxes, radio buttons, list boxes, edit controls and test boxes;

i) compact design maximizes available test area and can be floor or wall mounted; the unique cabinet architecture allows the test operator to access his work from three sides; since there is no front support the fixture cart rolls over the tray like a glove; this allows the use of this station with many hydraulic fluids such as Mil-Oil or phosphate ester hydraulic fluid;

j) the interface module bay at the station rear receives an interface module (see FIG. 10) configured for each test article; custom fixture electronics and connectors are placed at the module; the module is placed into the bay where it may be mated with a 150 pin non-insertion force connector, then thumb screws are tightened to secure the module to the station; switching from one setup to another takes only about 15 seconds;

k) the station typically utilizes MS-DOS® based computer system (see FIG. 12), operating on a pentium MHz processor, with 32 mb RAM; the computer's interface boards are mounted in a ISA back plane rack for easy service and upgrading; the entire computer system is housed within a sealed enclosure, cooled by an air to air heat exchanger, protecting the system from airborne oil contaminants and dust; for booting, the work station uses a 2 gb hard disk; all other programs and data are stored on a user supplied network server, communicating via Ethernet; this enables single copies of test software and data to reside in one location for all stations; in addition, this also enables remote programming, remote data analysis, and better quality control methods; an internal 3.5 inch floppy disk is also provided; the graphics display is a 15 inch viewable Super VGA color LCD monitor protected behind sealed, impact resistant glass; the keyboard is a very rugged, completely sealed, custom made silicone membrane with true switch movement; a sealed joystick is used to provide mouse emulation and hydraulic actuation control; all devices are resistant to phosphate ester and MIL-Oil hydraulic fluids; for hands free operation, the work station employs an integrated voice recognition system and human speech generator, utilizing it's own 80286 CPU and DSP processor, freeing the main CPU for other computing tasks.

Figure 1:
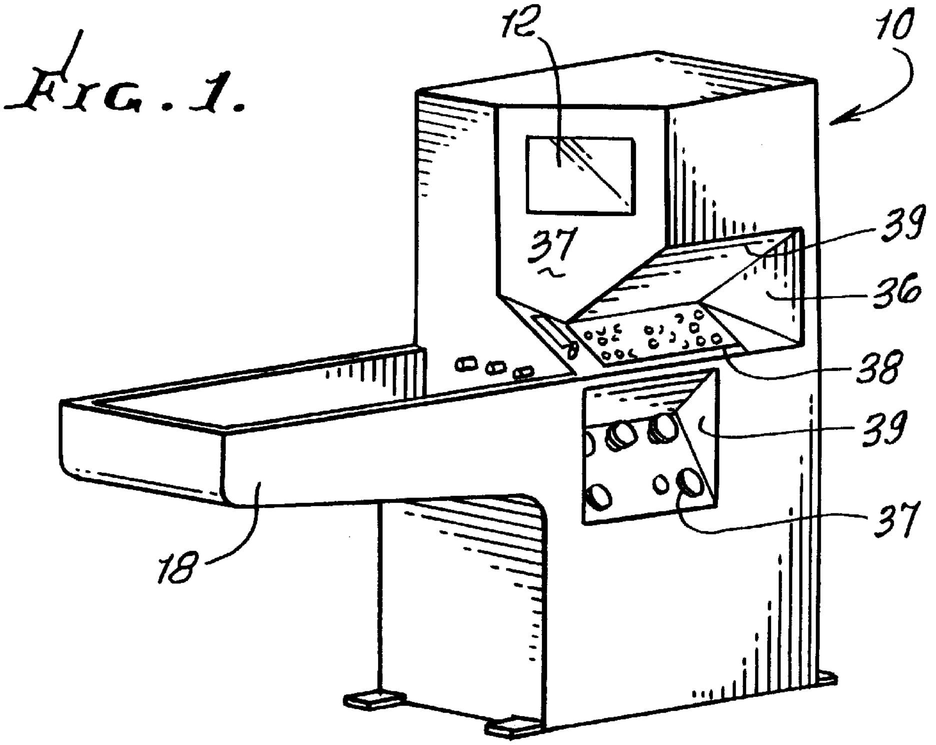
Figure 1A:
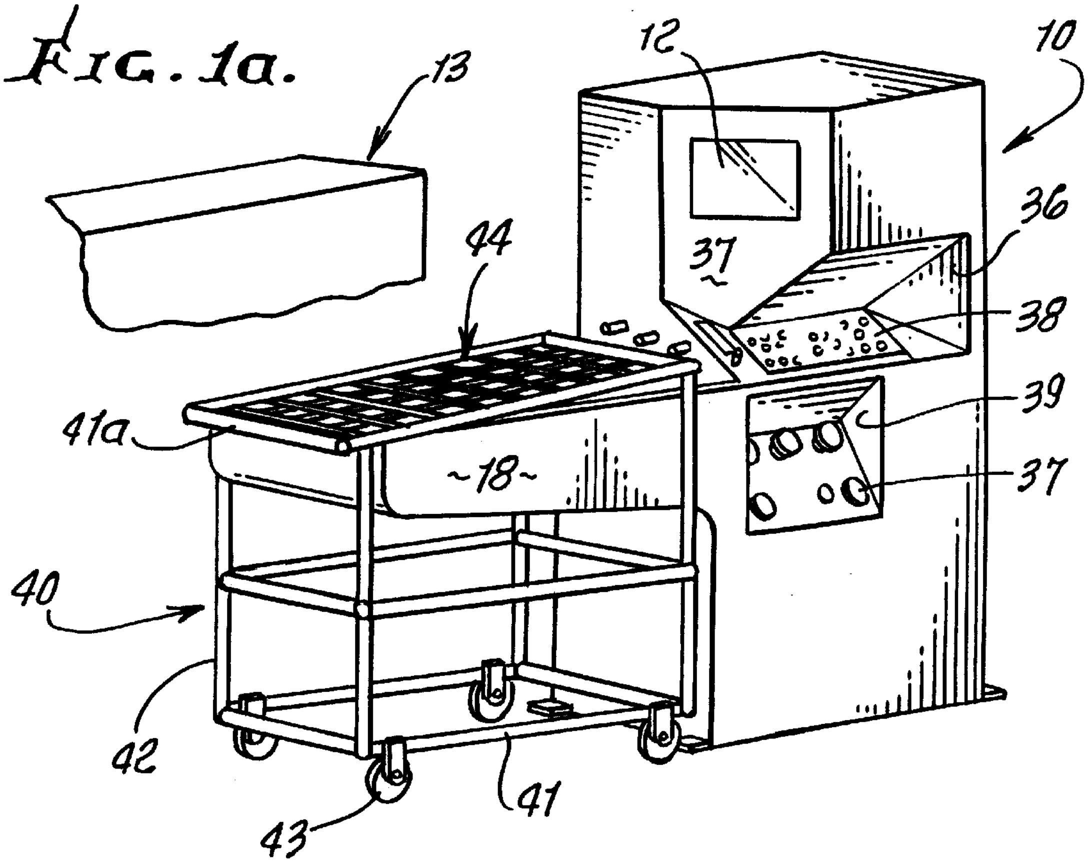
Figure 2:
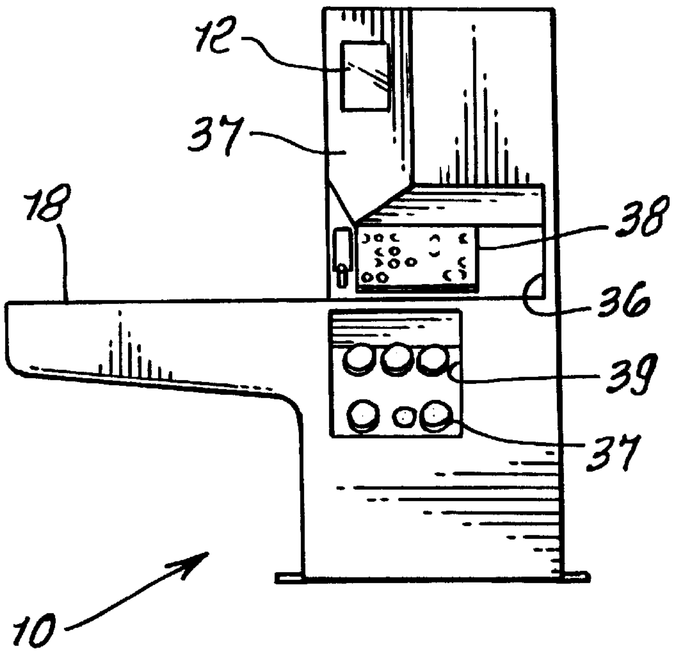
FIG. 2 is a frontal view of the FIG. 1 work station.
Figure 3:
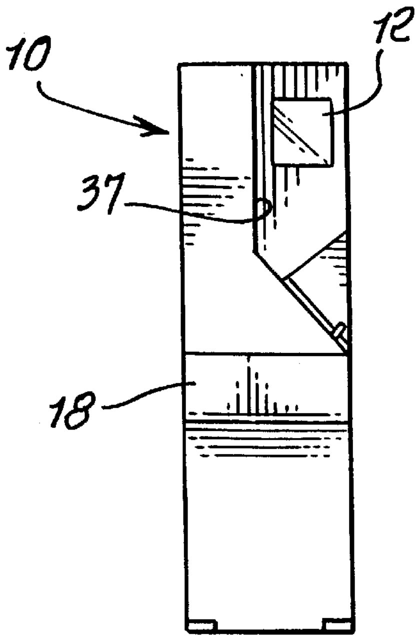
FIG. 3 is a left side view of the FIG. 1 work station.
Figure 4:
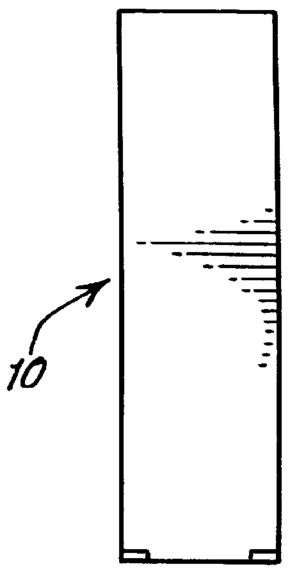
FIG. 4 is a right side view of the FIG. 1 work station.
Figure 5:
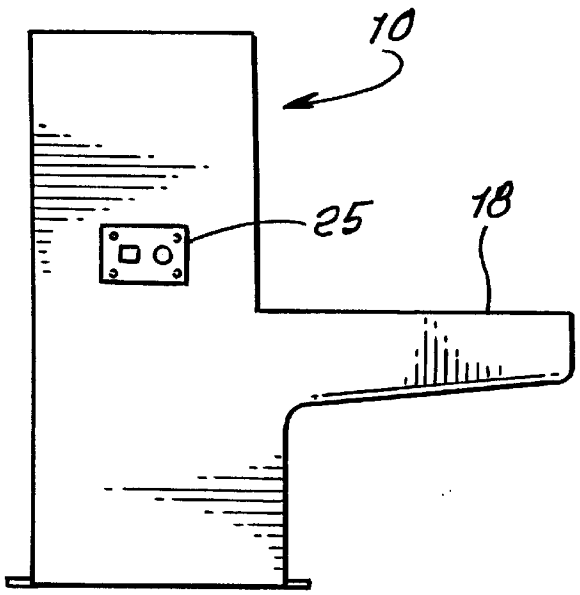
FIG. 5 is a rear view of the FIG. 1 work station.
Figure 6:
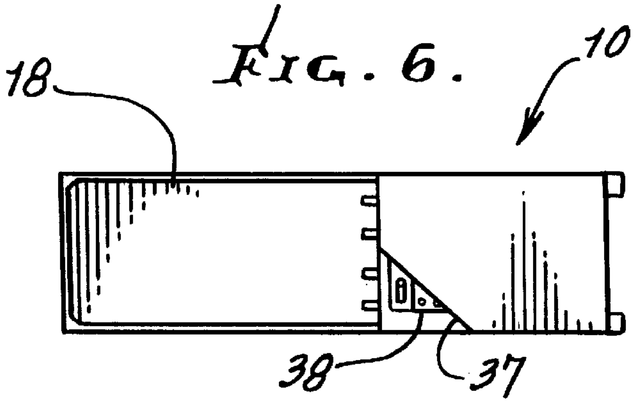
FIG. 6 is a top plan view of the FIG. 1 work station.
Figure 7:
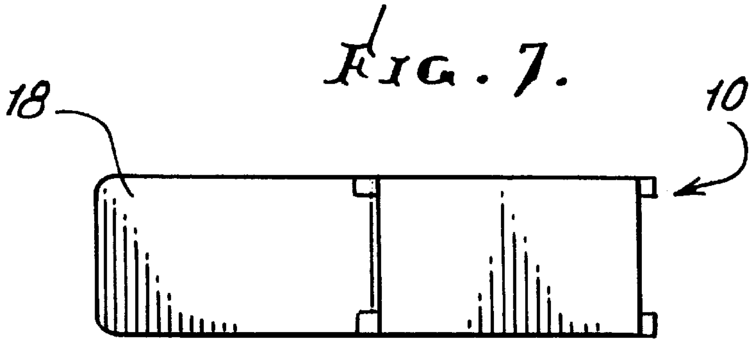
FIG. 7 is a bottom plan view of the FIG. 1 work station.

FIG. 9 shows like, first and second work stations 101 and 102, each like that of FIG. 1. They are offset as shown so that an operator can operate both stations from a position 103, such as a chair 103 between 101 and 102. All controls, displays and the hydraulic connectors at 36 are thereby accessible to the operator at 103.

We claim:

1. An automated work station for testing hydraulic equipment having first hydraulic input and output ports comprising in combination:

a) a test cabinet and associated input keyboard and test data display means, b) said cabinet having associated second hydraulic input and output ports to be coupled to said first ports, c) circuitry within the cabinet and connected with said keyboard to control display of hydraulic parameters to be tested, d) said circuitry having inputs to be electrically connected with selectable groups of terminals corresponding to selected hydraulic equipment to be tested, and e) there being a characteristic control circuit for each hydraulic equipment to be tested, each said characteristic control circuit being connectible with said circuitry in said cabinet.

2. The combination of claim 1 including a module carrying said characteristic control circuit, said characteristic control circuit and said circuitry at the cabinet having interconnectable pin and socket connection.

3. The combination of claim 2 wherein said module includes a circuit box and is removable from connection to the cabinet.

4. The combination of claim 1 including a tray projecting sidewardly from the cabinet, the equipment to be tested being positionable over the tray, whereby hydraulic leakage from said ports is collected in the tray.

5. The combination of claim 4 including an equipment carrier movable into and out of equipment testing position, and nested, relative to the tray.

6. The combination of claim 1 wherein the cabinet has an upper panel angled downwardly, said display comprising a CRT screen at said panel.

7. The combination of claim 1 wherein the cabinet has side wall means defining a first recessed zone, said keyboard located at said recessed zone.

8. The combination of claim 4 wherein said cabinet has side wall means defining a recessed zone, and including hydraulic valve controls at said recessed zone.

9. The combination of claim 7 wherein the cabinet has side wall means defining a second recessed zone, and including hydraulic valve controls at said second recessed zone.

10. The combination of claim 1 including auxiliary elements corresponding to each of a), b), c) and d) of claim 1, said auxiliary elements offset from said a) cabinet of claim 1, and an operation station located generally between the a) cabinet of claim 1 and the auxiliary cabinet.

11. The combination of claim 1 including a second work station as defined in claim 1 and positioned in offset relation to the work station of claim 1 so that an operator can operate both stations from a position between them.

12. The method of operating apparatus as defined in claim 4, that includes i) receiving hydraulic apparatus to be tested over the tray at the work station, ii) connecting hydraulic lines at the apparatus to be tested to hydraulic lines at the station, iii) and flowing hydraulic fluid from said apparatus to be tested to said station, and reusing characteristic of said fluid at the station.

13. The method of claim 11 which includes providing a plug-in circuit device having circuitry corresponding to the parameters of the hydraulic equipment to be tested, and connecting said device to said cabinet and to circuitry therein to enable testing of said parameters and display of test results.

14. The combination of claim 5 wherein said carrier includes a frame supporting the hydraulic equipment about the frame, the frame and tray having telescopic interfit, lengthwise of the tray.

15. The combination of claim 14 including a screen extending generally horizontally under the equipment and over the tray.

16. The combination of claim 8 wherein said control are located at substantially the same level as said tray.

* * * * *